Figure 3:
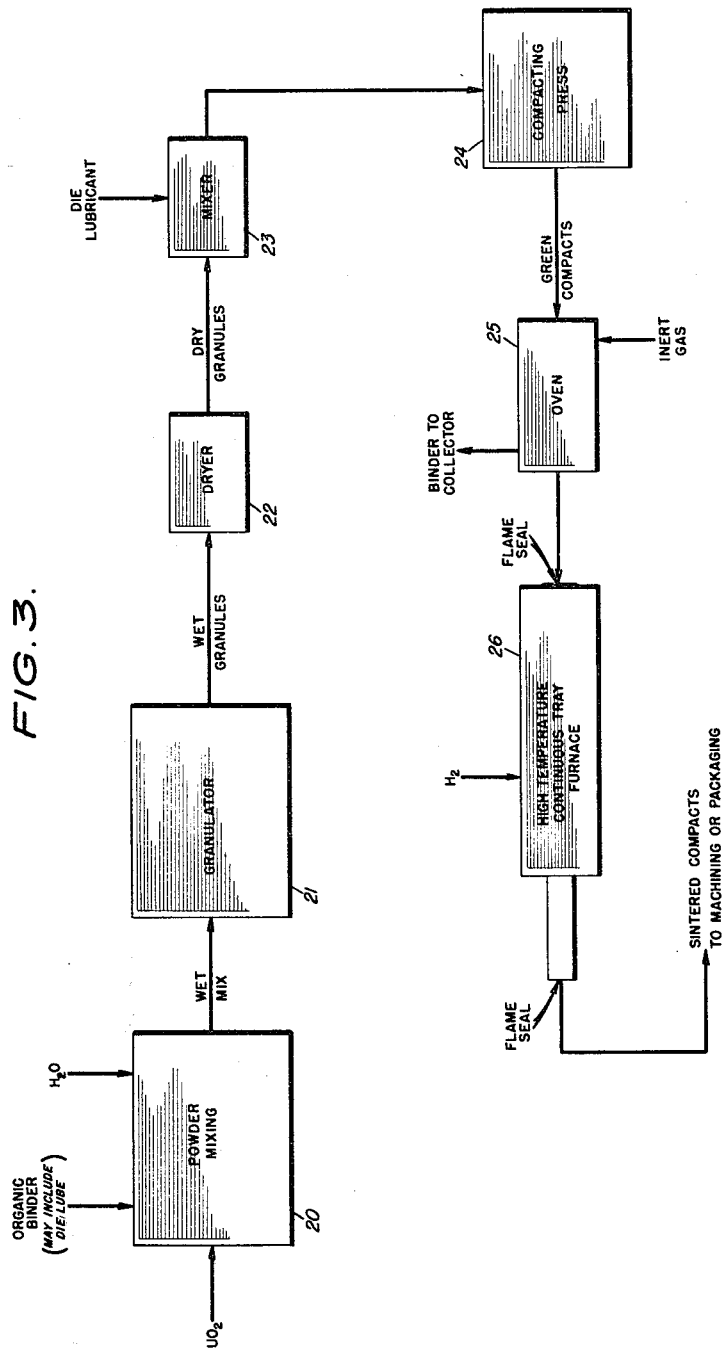

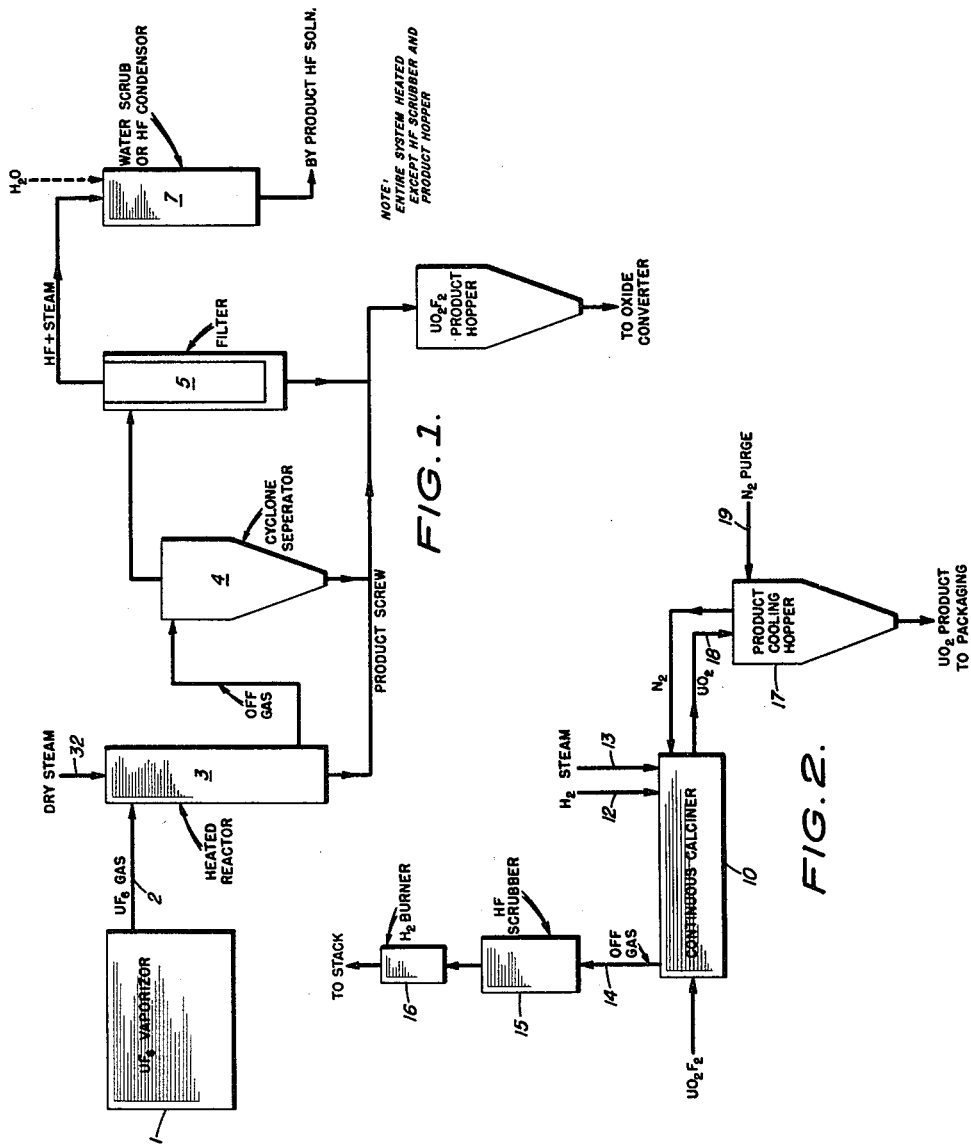

Feb. 2, 1965 S. L. REESE ET AL 3,168,369
URANIUM PROCESSING
Filed Dec. 18, 1961 2 Sheets-Sheet 2

S. L. REESE
T. C. RUNION
INVENTORS

BY Joseph P. Nigon
ATTORNEY

United States Patent Office 3,168,369
Patented Feb. 2, 1965

3,168,369
URANIUM PROCESSING
Stanton L. Reese and Thomas C. Runion, both of Erwin, Tenn., assignors to W. R. Grace & Co., New York, N.Y., a corporation of Connecticut
Filed Dec. 18, 1961, Ser. No. 159,974
4 Claims. (Cl. 23—14.5)

This application relates to the processing of uranium and more particularly concerns a "dry" process for the conversion of the hexafluoride of this metal to the dioxides, trioxides or octo-oxides. The oxides have a high degree of chemical purity and the dioxides have highly desirable physical properties such that when compacted they sinter to extremely high density at elevated temperatures. This invention applies particularly to $UF_6$ where the principal uranium isotopes are U-238 and U-235.

Since $UF_6$ is the uranium compound used in obtaining any desired U-235:U-238 ratio, it is the most common raw material used to produce various commercially usable uranium compounds and the metal, except where the U-235:U-238 ratio is that found in nature. Uranium trioxide ($UO_3$) presently has experimental application. Triuranium octo-oxide ($U_3O_8$) has considerable application in ceramic coloring and in nuclear fuels. Uranium dioxide ($UO_2$) is used extensively as a nuclear fuel and principally where it has been compacted and further densified by treatment at high temperature.

The production of these oxides was heretofore accomplished by the reaction of the hexafluoride with a liquid and the precipitation in a liquid of an uranium compound, which could require such steps as filtering, washing, drying, heating in the required atmosphere to produce the desired oxide, and grinding of the oxide if a fine powder was desired. Due to the peculiar fissioning property of the uranium 235 isotope, which upon fissioning releases considerable quantities of neutrons and other radioactivity, its concentration must be controlled in chemical processing of uranium to prevent a nuclear reaction.

It is, accordingly, the principal object of the invention to provide a process which economically converts the hexafluoride of uranium to a fine oxide powder of desired particle diameter without grinding, and to produce a dioxide that, when compacted, will readily densify upon exposure to high temperature to a piece having fine grain, good physical integrity and a density from 90% to 99% of the theoretical density of the dioxide.

Another object of the invention is to provide process conditions such that uranium may be processed and the U-235 content of the apparatus may be increased, where the U-235:U-238 ratio is sufficiently high that a nuclear reaction is possible, by reducing the hydrogen available for neutron moderation below that found in hydrogenous liquid solutions.

Other objects and advantages will be apparent as the description of the invention proceeds.

Our invention resides in the discovery that the reaction of $UF_6$ gas with dry steam continuously where the temperature of the apparatus is maintained above the condensation temperature (230–350° F.—preferably 300° F.) of steam at the pressures (approximate 1 atmosphere) found in the apparatus, produces a fine, dry powder, uranium oxyfluoride. The reaction is given by the following chemical equation:

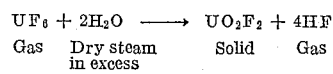

$UF_6$ + $2H_2O$ $\longrightarrow$ $UO_2F_2$ + $4HF$
Gas   Dry steam   Solid   Gas
       in excess We have found that the powder, which has many small particles of about 0.10 micron in diameter, can be separated from the hydrogen fluoride gas and the excess steam by gravity, followed by such methods of separation as high velocity cyclone separators, backed by small pore filters. The configuration of the chamber for contacting $UF_6$ and steam can be varied, providing the two gases contact each other somewhere in the system since reaction is instantaneous. In this process two-thirds of the fluoride from the compound $UF_6$ is removed from the uranium as hydrogen fluoride or hydrofluoric acid gas. This gas passes off and may be inexpensively dissolved in a water scrubber, as opposed to neutralizing it with more expensive neutralizing compounds, as is required in a liquid process where all the fluorine dissolves with the uranium. In the liquid process large volumes of filtrate are encountered from the precipitation of the uranium, and large volumes of wash water are often required to remove the fluorides from the precipitate. These filtrates generally contain sufficient uranium to require processing to remove the uranium before they may be discarded. The uranium content of the filtered gases from our process is sufficiently low that the scrub solution will contain 0.01 to 0.05 gram per liter uranium and need not be treated for uranium removal.

The $UO_2F_2$ powder produced by this process is not free-flowing, but tends to cling together. It does not, however, have a tendency to pack. We have discovered that the powder may be fed into a conventional screw feeder by vibration such as that obtained with conventional electric or air vibrators and that the material will feed very well through a screw feeder. Upon being delivered from the screw, it is a powder and very similar in appearance to the $UO_2F_2$ fed into the screw. We have discovered that if the powder is subjected to a temperature of 800° F. to 1000° F. in steam and in the absence of air $UO_3$ powder is produced, as given in the following chemical formula:

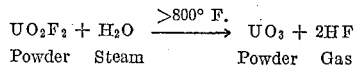

$$UO_2F_2 + H_2O \xrightarrow{>800° F.} UO_3 + 2HF$$
Powder   Steam                Powder   Gas We have found that at a slightly greater temperature in the presence of air or other oxygen containing gas the resultant product is $U_3O_8$. We have discovered that the $UO_2F_2$ powder, when heated to a temperature 1000° F. to 1800° F. in the presence of hydrogen, reacts according to the following chemical equation:

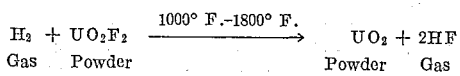

$$H_2 + UO_2F_2 \xrightarrow{1000° F.-1800° F.} UO_2 + 2HF$$
Gas   Powder                        Powder   Gas We have discovered that the presence of a small but finite quantity of steam in the reactant gas is beneficial in reducing the fluoride content of the resulting $UO_2$ product.

Although the reactant gases flow counter-current to the direction of the powder in our apparatus, thus minimizing HF contact with the $UO_2$ product, $UO_2$ will react with HF at these temperatures and the addition of steam with the hydrogen drives the reaction shown in the following chemical equation to the left, giving the desired product:

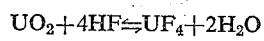

$$UO_2 + 4HF \rightleftharpoons UF_4 + 2H_2O$$

The addition of steam also aids in the dilution and rapid removal of by-product HF. Typically, the resulting $UO_2$ produced in our apparatus has 50 p.p.m. to 131 p.p.m. fluorine, whereas without the actions of steam described above, fluorine often occurs in excess of 1000 p.p.m. We have found that the $UO_2F_2$ may be continuously or semi-continuously reacted to a static bed and that the reaction to oxide also proceeds very well in a rotating tube calciner or stationary tube with a revolving ribbon-flite screw. Although other materials of construction may be satisfactory, we have found nickel alloys to be the most resistant to the corrosive atmosphere.

We have discovered that the average particle size of either $UO_2$ or $U_3O_8$ product can be controlled within a range of 0.55 and 2.5 microns average particle diameter by controlling the temperature at which the $UO_2F_2$ is subjected in its conversion to $U_3O_8$ or $UO_2$ between 1000° F. and 1400° F. In the lower temperature range, the reaction of $UO_2F_2$ with steam and air or steam and hydrogen promotes fluoride removal. Both the presence of fluoride and high temperature have a tendency to agglomerate and densify the particles, resulting in both an increase in the average particle diameter and in bulk density. The bulk density varies directly with the particle size in this temperature range and has been observed in the range of 0.65 gm./cc. to 1.5 gms./cc. Above 1400° F. the particle size continues to increase, but the bulk density remains nearly constant; the process of this invention lends itself to the production of a controlled particle size and bulk density as desired within the ranges stated to meet the various requirements for fabrication.

It is known that when the percent of the uranium 235 isotope associated with the U-238 isotope has been increased over that found in nature, i.e., 0.7115% U-235 balance principally U-238, the U-235 may fission under proper conditions of neutron moderation and reflection. The higher the percentage of the U-235 isotope in a given quantity of uranium, the greater the probability of a nuclear reaction. Also, over a wide range the more neutron moderator present the greater the probability of a nuclear reaction. Hydrogen is an excellent neutron moderator and the presence of hydrogen atoms in hydrogenous liquids such as water greatly limits the quantity of U-235 and, in turn, the batch size that may be "safely" processed in a given apparatus in a hydrogenous liquid at one time. "Safely," as used here, pertains to a nuclear reaction with its resulting radiation, which must be avoided in chemical processing. Table I shows the difference in the U-235 mass that may be permitted in an apparatus of any geometry in steam at 300° F. and atmospheric pressure, and in liquid water for some typical U-235 concentrations given as percent U-235 in total U-235 plus U-238 (enrichment). It is apparent, from the table, that from 5 to 100 times more material may be safely contained in our process equipment than in a liquid process, thus permitting much greater throughput.

TABLE I

U-235 mass safe in liquid $H_2O$ vs. U-235 mass safe in steam

| U-235 Enrichment, percent | Liquid ($H_2O$) Any U-Concentration U-235 mass, kg. | Steam (300° F. and one atmosphere) U-235 mass, kg.[1] |
|---|---|---|
| 2.0 | 2.00 | 9.5 |
| 4.0 | 0.940 | 17.0 |
| 10.0 | 0.600 | 28.5 |
| 20.0 | 0.480 | 33.6 |
| 93+ | 0.350 | 39.0 |

[1] $UO_2F_2$ at 0.2 gm./cc.

It is apparent from the description of the process that only steam, hydrogen, which may be disassociated ammonia, and air are required as raw materials for this process with water in the off-gas scrubber. No chemically basic compounds or other agents are required.

It is known in the art of compacting and sintering $UO_2$ into shapes, that a small average particle size of about one micron diameter and large particle surface area are advantageous to obtaining good densification when the compact is subjected to elevated temperatures. It is also known in the art that $UO_2$ produced at low temperatures is much more active and densifies more readily than $UO_2$ powder which has been produced at or subjected to high temperatures.

Without particle size reduction this powder, when compacted to a density of only 6.3 gms./cc. and when heated to 1600° C. in hydrogen, densified in excess of 94% of theoretical. When compacted to 6.8 gms./cc. and treated as above, the sintered compacts were in excess of 96% of theoretical. The sintered compacts appeared physically sound and of fine grain. Therefore, by the process of this invention, $UO_2$ is produced which has improved densification properties when compacted and subjected to elevated temperatures.

Our invention is illustrated by the following specific by non-limiting examples.

EXAMPLE I

Applied operation of the process is best shown with reference to FIGURE 1. This drawing shows graphically the production of $UO_2F_2$ from $UF_6$.

In this process, 91.4 pounds of $UF_6$ were passed through the system per hour. The $UF_6$ was vaporized in the vaporizer 1 which is heated to 170–250° F. The gaseous $UF_6$ was passed through the line 2 which was heated to 300° F. to the reactor 3. Dry steam was fed into the reactor through the line 32 at a rate of 18.8 pounds of steam (as $H_2O$) per hour. The off-gases from this operation which consists of hydrogen fluoride and steam were passed into the cyclone separator 4 and through the filter 5. The effluent from the filter was a mixture of HF and steam which was passed through a water scrubber to recover the HF solution as a by-product. The product, $UO_2F_2$, was collected in three areas in the bottom of the reactor 3, cyclone separator 4, and the filter unit 5. The product was then passed into a product hopper for use in subsequent steps. Using the feed rates set out above, a production of 80 pounds of $UO_2F_2$ per hour was maintained in the continuous operation. The equipment was operated at pressures of 0 to 3 p.s.i.g. with no effort being made to increase the pressure above atmospheric.

The reactor was a 11½ inch internal diameter vertical tube which had a vibrator attached at the reaction zone, the reactor was heated to a temperature of 300–500° F. The product $UO_2F_2$ was used in subsequent operations such as described in the following examples. The percentage distribution of the $UO_2F_2$ product recovered from the various points in the system is shown in Table II. The vast majority of the product was collected from the bottom of the reactor and the first cyclone. Minor amounts were recovered from the filters and scrub solution. The chemical and physical properties of the $UO_2F_2$ product are shown in Table III.

TABLE II

| Run Number | 1 | 2 | 3 |
|---|---|---|---|
| Bottom of Reactor, percent | 35.9 | 38.40 | 53.20 |
| First 6" Cyclone, percent | 48.7 | 34.3 | 33.4 |
| Second 6" Cyclone, percent | 8.1 | 22.0 | 11.9 |
| Filters, percent | 6.6 | 3.2 | 1.2 |
| Scrub Solution, percent | 0.7 | | 0.3 |

TABLE III

| Element | Typical analysis, p.p.m. | Maximum impurities, p.p.m. |
|---|---|---|
| Ag | <0.1 | <0.1 |
| Al | <2 | <2 |
| As | ND<10 | ND<10 |
| Au | 1.0 | 1.0 |
| B | 0.28 | 0.28 |
| Ba | ND<5 | ND<5 |
| Be | ND<.5 | ND<.5 |
| Bi | <1 | ND<1 |
| Cd | 0.11 | 0.13 |
| Co | <5 | <5 |
| Cr | <3 | <3 |
| Cu | 85 | >100 |
| Fe | 10 | <10 |
| Ge | ND<1 | ND<1 |
| Hg | ND<10 | ND<10 |
| Li | ND<50 | ND<50 |
| Mg | 5 | 5 |
| Mn | 2 | 1 |
| Mo | <1 | <1 |
| Na | ND<75 | ND<75 |
| Ni | 63 | 135 |
| P | <10 | <10 |
| Pb | <1 | 3 |
| Sb | ND<1 | ND<1 |
| Si | 3 | 3 |
| Sn | 2 | 2 |
| Sr | ND<100 | ND<100 |
| Te | ND<1 | ND<1 |
| Ti | ND<100 | ND<100 |
| Tl | ND<1 | ND<1 |
| V | ND<10 | ND<10 |
| Zn | 37 | 42 |
| U | 77.0% | |
| F | 12.5% | |
| L.O.I. at 250° F | 0.47% | |

Physical Characteristics:
  Average particle diameter _____ 0.2 microns.
  Bulk density _____ 0.2 gm./cc.
  Porosity _____ +800.

EXAMPLE II

A typical utilization of the $UO_2F_2$ produced in the process described in Example I is illustrated in FIGURE 2. This diagram shows the plant process for the preparation of $UO_2$ from the $UO_2F_2$ product. In this reactor $UO_2F_2$ was fed into the continuous calciner 10 at a rate of 80 pounds of $UO_2F_2$ per hour. Hydrogen was fed into the reactor into the line 12 at a rate of 0.8 pound per hour and steam was fed at a rate of 9.36 pounds per hour, through the line 13. The reactor was heated to a temperature of 1200–1300° F. The off-gas from the reactor which contains steam, hydrogen, and HF was removed through the off-gas line 14 through the HF scrubber 15 and the hydrogen was removed from the off-gas by burning it in the hydrogen burner 16 before venting it to the stack. The product from the calciner was passed through a line 18 to the cooling hopper 17, a nitrogen purge from line 19 was fed continuously through the reactor to help cool the product and to insure adequate off-gas removal. This equipment and process makes it possible to produce 70 pounds of $UO_2$ per hour. The equipment was operated at a pressure of 0 to 5 p.s.i.g. with a residence time of 2 hours in the reactor. The reactor was 11½ inches in diameter and 21½ feet long. The reactor was equipped with a variable speed nickel alloy ribbon flight screw with one end free. The product was removed from the product cooling hooper and packaged in the $UO_2$ product packaging, or is used to prepare compacts as described in Example III. The effect of temperature variation from 1000 to 1400° F. in the preparation of $UO_2$ is shown in Table IV. The product obtained at 1000° F. was less dense than the materials prepared at higher temperatures, but had essentially the same porosity characteristics of the material prepared at 1200° F., and in general was a good product. The data indicates that a satisfactory product for densification by sintering can be obtained at operation from 1000–1400° F. Preferred conditions would be 1200–1400° F.

EXAMPLE III

The uranium dioxide ($UO_2$) prepared from the process described in Example II can be formed into sintered compacts using the equipment shown diagrammatically in FIGURE 3. The process is as follows: $UO_2$ was fed into the product mixing zone 20 where it was mixed with an organic binder and water. This wet mix was passed to the granulator 21 where it was ground wet to reduce the size of the particles. The wet granules were fed to the dryer 22 where the water was removed and then to a mixer 23 where they were prepared for compacting by the addition of a die lubricant. The mixed product was fed to the compacting press 24 and the green compacts were fed into an oven 25 where the binder was removed by the combination of heat and the sweep of an inert gas. The compacts were then transferred to the high temperature furnace 26 where they were heated in the presence of hydrogen. The sintered compacts were removed from this furnace and were then ready for machining or packing. Using this process, it is possible to prepare a uranium dioxide which has the chemical properties set out in Table V. When compacted to a density of 6.3 grams per cc. and heated to 1600° C. in the furnace described above, the resulting density is in excess of 94% of theoretical. When compacted to 6.8 grams per cc. and treated as above, the compacts are in excess of 96% theoretical density. Therefore, by the processes of this invention, $UO_2$ is produced which has improved densification properties when compacted and subjected to elevated temperatures.

TABLE IV

| Test No. | Temp., °F. | Color | Porosity | Particle Size | Bulk Density, g./cc. | Tap Density, g./cc. | Percent $\mu$ | p.p.m. F- | O/U |
|---|---|---|---|---|---|---|---|---|---|
| 1 | 1000 | Light brown, orange and grey particles. | .80 | Est. .58$\mu$ | .84 | 1.28 | 87.87 | 558 | 2.053 |
| 2 | 1200 | Medium brown | .80 | 1.0$\mu$ | 1.2 | 1.7 | 88.00 | 105 | 2.028 |
| 3 | 1400 | Medium brown orange particles | .79 | 2.2$\mu$ | 1.41 | 2.13 | 88.05 | 65 | 2.019 |
| 4 | 1600 | Dark brown, orange and white particles. | .794 | 1.68$\mu$ | 1.32 | 1.93 | 88.08 | 47 | 2.013 |
| 5 | 1400 | Medium brown | .80 | .86$\mu$ | .68 | 1.6 | 88.06 | 61 | 2.018 |

TABLE V

Chemical:
  Percent U—87.92
  Fluorine—70 p.p.m.          O/U Ratio—2.04

| Spectrochemical | Concentration (p.p.m.) |
|---|---|
| Element: | |
| Ag | <.1. |
| Al | 2. |
| As | <10. |
| Au | 3.1. |
| B | .17. |
| Ba | <5. |
| Be | <.5. |
| Bi | <1. |
| Cd | .1. |
| Co | 12. |
| Cr | 6. |
| Cu | 48. |
| Fe | 48. |
| Ge | <1. |
| Hg | <10. |
| Li | <50. |
| Mg | 5. |
| Mn | 5. |
| Mo | 1. |
| Na | <75. |
| Ni | 207. |
| P | <10. |
| Pb | <1. |
| Sb | <1. |
| Si | 12. |
| Sn | 10. |
| Sr | <100. |
| Te | <1. |
| Ti | <100. |
| V | <10. |
| Zn | 39. |
| Physical: | |
| Bulk Density | .654 gms./cc. |
| Tap Density | 1.255 gms./cc. |
| Porosity | +.800. |
| Particle (average) | .55 microns. |

$UO_2$ has been produced by the process of this invention with chemical properties very similar to those given in Table V above and physical properties as follows:

Bulk density _____ .80 gms./cc.
Tap Density _____ 1.52 gms./cc.
Porosity _____ .770.
Average particle size _____ 1.04 microns.

Obviously, many modifications and variations of the invention, as herein and above set forth, may be made without departing from the essence and scope thereof, and only such limitations should be applied, as indicated in the appended claims.

What is claimed is:

1. A process for the preparation of uranium trioxide which comprises converting gaseous uranium hexafluoride to uranyl fluoride by treating the hexafluoride with steam at a temperature of about 230° to 350° F. at atmospheric pressure followed by conversion of the uranyl fluoride to uranyl oxide by treatment of the fluoride at a temperature about 800° to 1000° F. in the presence of steam while carefully excluding air from the reactor and recovering the uranium trioxide product.

2. A process for the preparation of triuranium octoxide which comprises converting gaseous uranium hexafluoride to uranyl fluoride by treatment of the hexafluoride with steam at a temperature of about 230 to 350° F. at atmospheric pressure followed by conversion of the uranyl fluoride to the octoxide by treatment of the uranyl fluoride at a temperature of about 1000° to 1800° F. with steam and air and recovering the octoxide product.

3. A process for preparing uranium dioxide with an average particle diameter of 0.55 to 2.5 microns and a bulk density of 0.65 to 1.5 grams per cc. which comprises treating gaseous uranium hexafluoride with steam at a temperature of 230–350° F., followed by treatment of the uranyl fluoride with hydrogen at a temperature of 1000 to 1400° F. for a period of about 2 hours and recovering the uranium dioxide product.

4. A process for preparing uranium dioxide with an average particle size of 0.55 to 2.5 microns and a bulk density of 0.65 to 1.5 wherein the uranium dioxide product contains no more than about 50 to 131 p.p.m. of fluorine which comprises vaporizing $UF_6$ by heating to a temperature of about 170–250° F., passing the hexafluoride vapor into a reactor maintained at about 230 to 350° F., where it is contacted with dry steam at about atmospheric pressure, transferring the uranyl fluoride formed to a reactor maintained at a temperature of about 1200–1300° F. where it is contacted with a hydrogen-steam mixture containing about 7.9 weight percent hydrogen and about 92.1 weight percent steam for a period of about 2 hours and recovering the uranium dioxide product.

References Cited by the Examiner

UNITED STATES PATENTS 2,906,598  9/59  Googin _____ 23—14.5
3,051,566  8/62  Schwartz _____ 23—14.5

OTHER REFERENCES

Katz et al.: "The Chemistry of Uranium," 1st Ed. (1951), pp. 319–321, 570–572. McGraw-Hill Book Co., N.Y.C.

AEC Documents: ANL–6023, pp. 3–7, 10–14, August 1959; ANL 6145, pp. 124–128, Chem. Eng. Division. Summary Report for January-March 1960; ANL6183, pp. 118–122, Chem. Eng. Division. Summary Report for April-June 1960.

CARL D. QUARFORTH, *Primary Examiner.*